Figure 5:
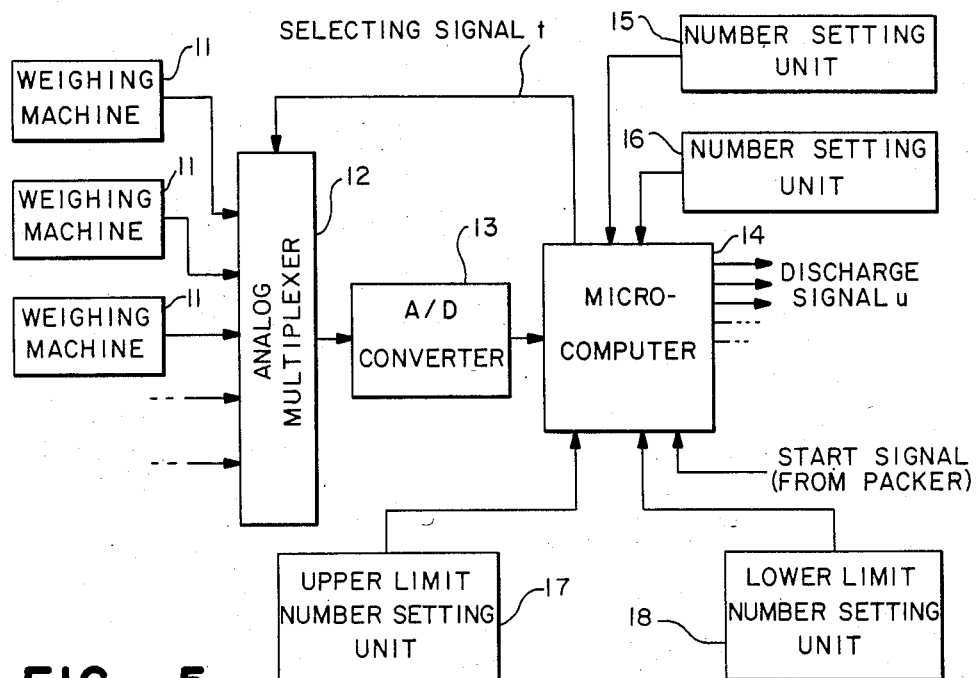

United States Patent [19]

Minamida et al.

[11] Patent Number: 4,645,019

[45] Date of Patent: Feb. 24, 1987

[54] METHOD OF WEIGHTING AND COUNTING

[75] Inventors: Kazukiyo Minamida; Yoshiharu Asai, both of Kurita, Japan

[73] Assignee: Kabushiki Kaisha Ishida Koki Seisakusho, Kyoto, Japan

[21] Appl. No.: 785,102

[22] PCT Filed: Jun. 24, 1981

[86] PCT No.: PCT/JP81/00146

§ 371 Date: Feb. 16, 1982

§ 102(e) Date: Feb. 16, 1982

[87] PCT Pub. No.: WO82/00198

PCT Pub. Date: Jan. 21, 1982

Related U.S. Application Data

[63] Continuation of Ser. No. 611,397, May 18, 1984, which is a continuation of Ser. No. 355,597, Feb. 16, 1982, abandoned.

[30] Foreign Application Priority Data

Jul. 1, 1980 [JP] Japan ................................. 55-90461
Aug. 15, 1980 [JP] Japan ............................... 55-112834

[51] Int. Cl.⁴ ........................................... G01G 19/22
[52] U.S. Cl. ........................................... 177/25; 177/1
[58] Field of Search ....................................... 177/1, 25

[56] References Cited

U.S. PATENT DOCUMENTS 2,802,658 8/1957 Hensgen et al. ...................... 177/1
3,939,928 2/1976 Murakami et al. .................... 177/25
4,267,894 5/1981 Hirano et al. ......................... 177/25
4,308,928 1/1982 Oshima ................................. 177/25
4,313,507 2/1982 Hays .............................. 177/25 X
4,336,852 6/1982 Hirano ................................. 177/25
4,336,853 6/1982 Hirano ................................. 177/25
4,341,274 7/1982 Hirano et al. ......................... 177/25
4,344,492 8/1982 Hirano ................................. 177/25

Primary Examiner—George H. Miller, Jr.
Attorney, Agent, or Firm—Flehr, Hohbach, Test, Albritton & Herbert

[57] ABSTRACT

A weighing method comprising a process in which a plurality of weighing machines weigh goods, and the weighing values obtained by the weighing machines are combinational-added to compute total weight of all the combinations, so that a combination equal to or nearest the set weight is obtained among the combinations of total weight, thereby discharging groups of goods corresponding to the obtained combination from the weighing machines corresponding thereto. Hence, the weighing method can carry out the weighing of an extremely high accuracy even when the objective goods are larger in the weight and dispersion thereof or relatively smaller in the set weight in comparison with the unit weight. Also, it is possible for the method to divide weighing values gained from each weighing machine by the unit weight of the goods and convert the values into the number of goods and then the same combinational addition is carried out, thereby accurately measuring a desired number of goods.

14 Claims, 11 Drawing Figures

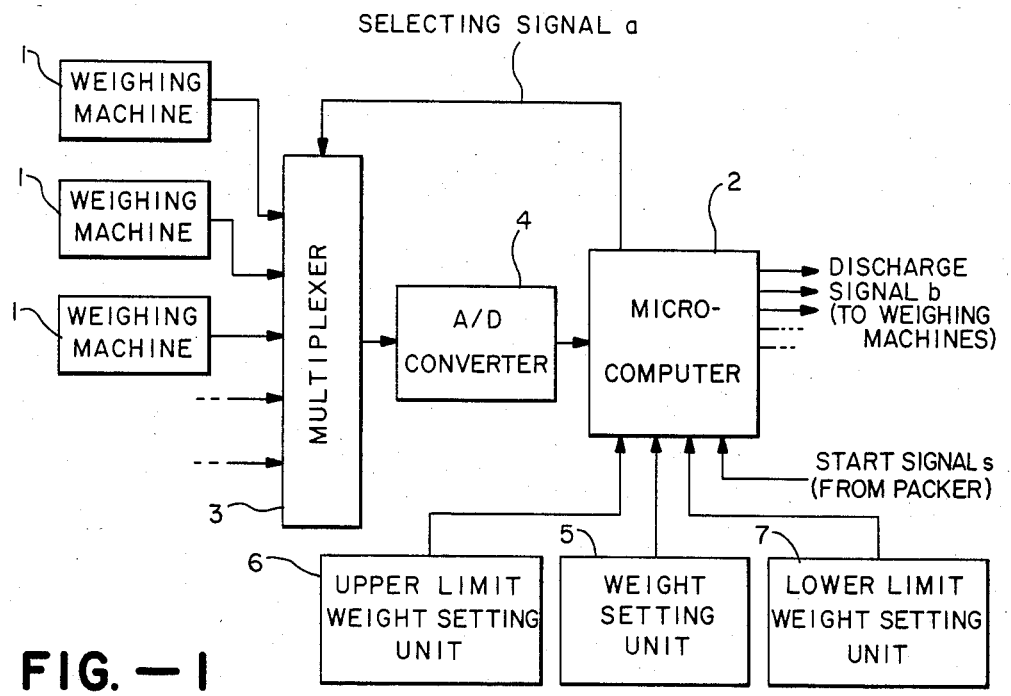
FIG.—1
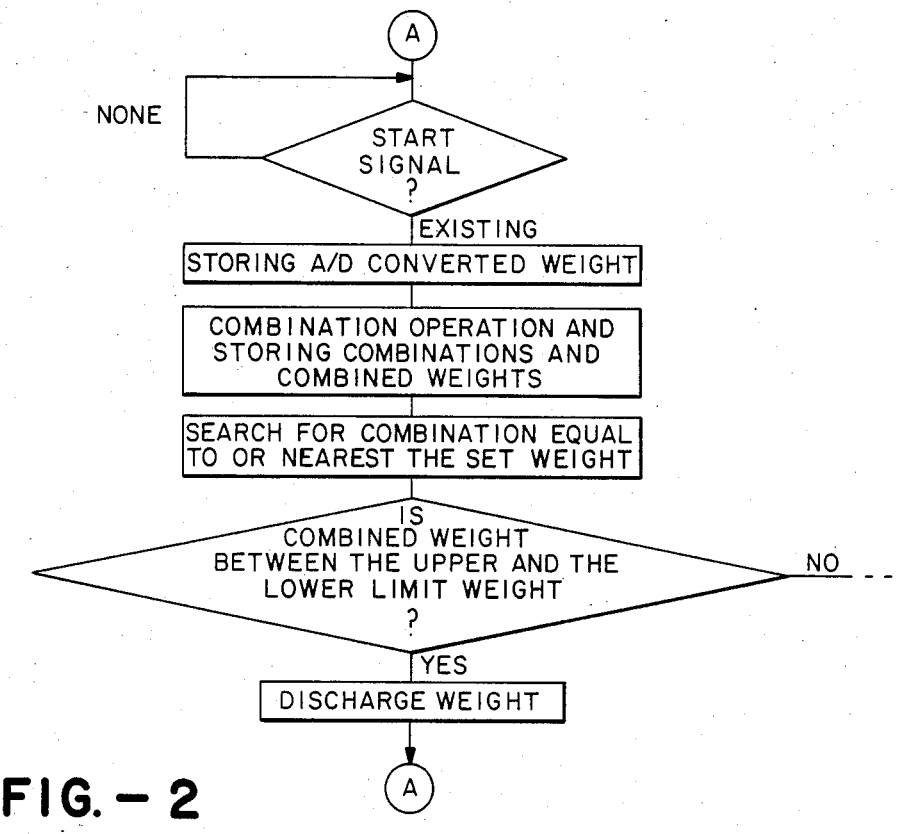
FIG.—2

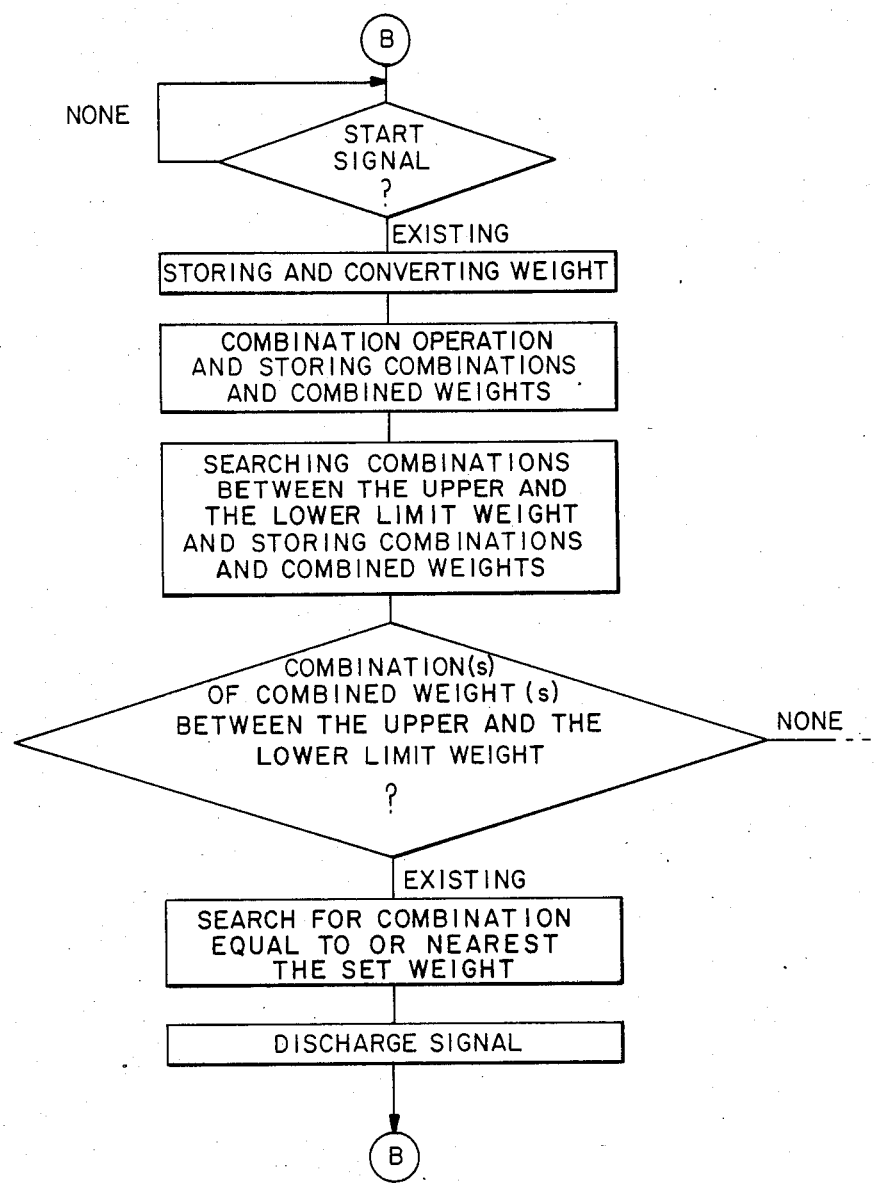
FIG.—3

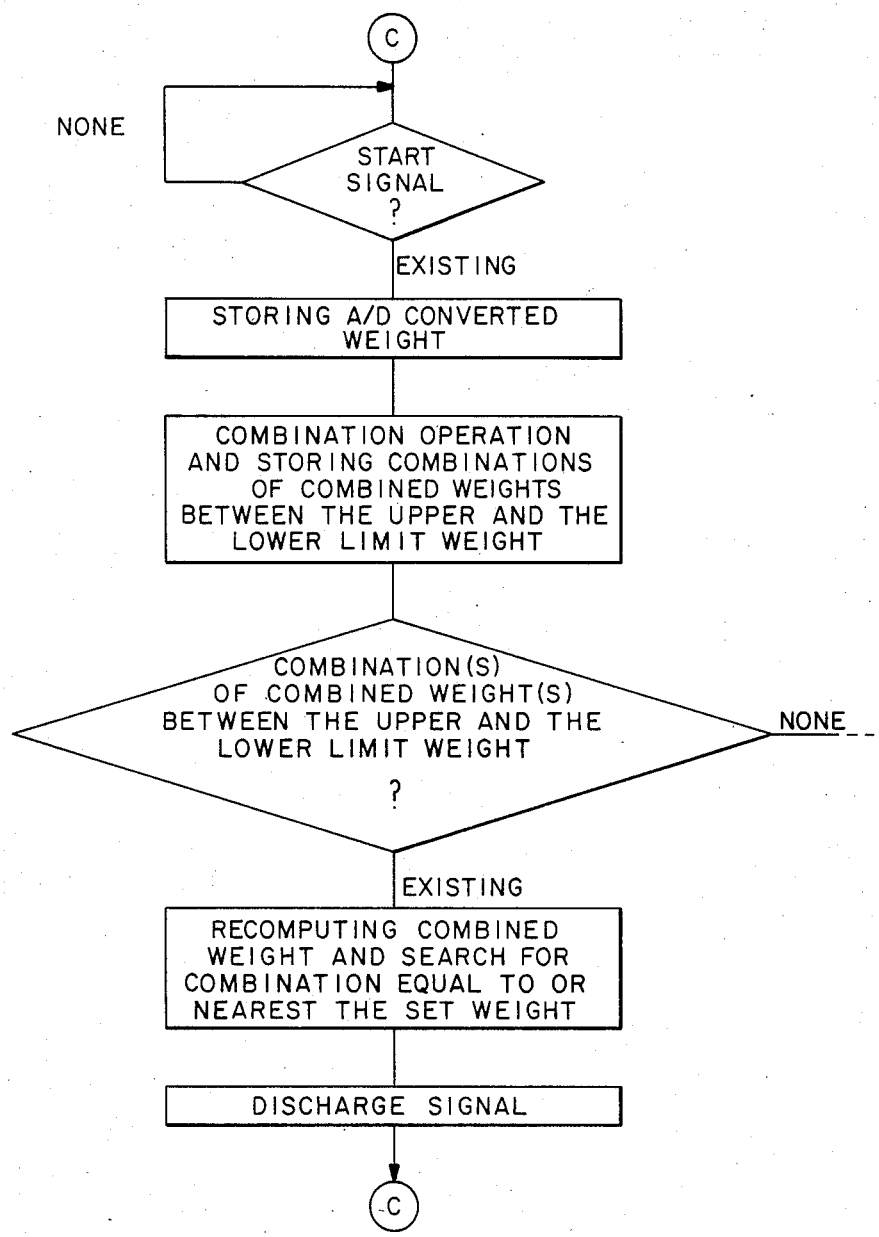
FIG. — 4

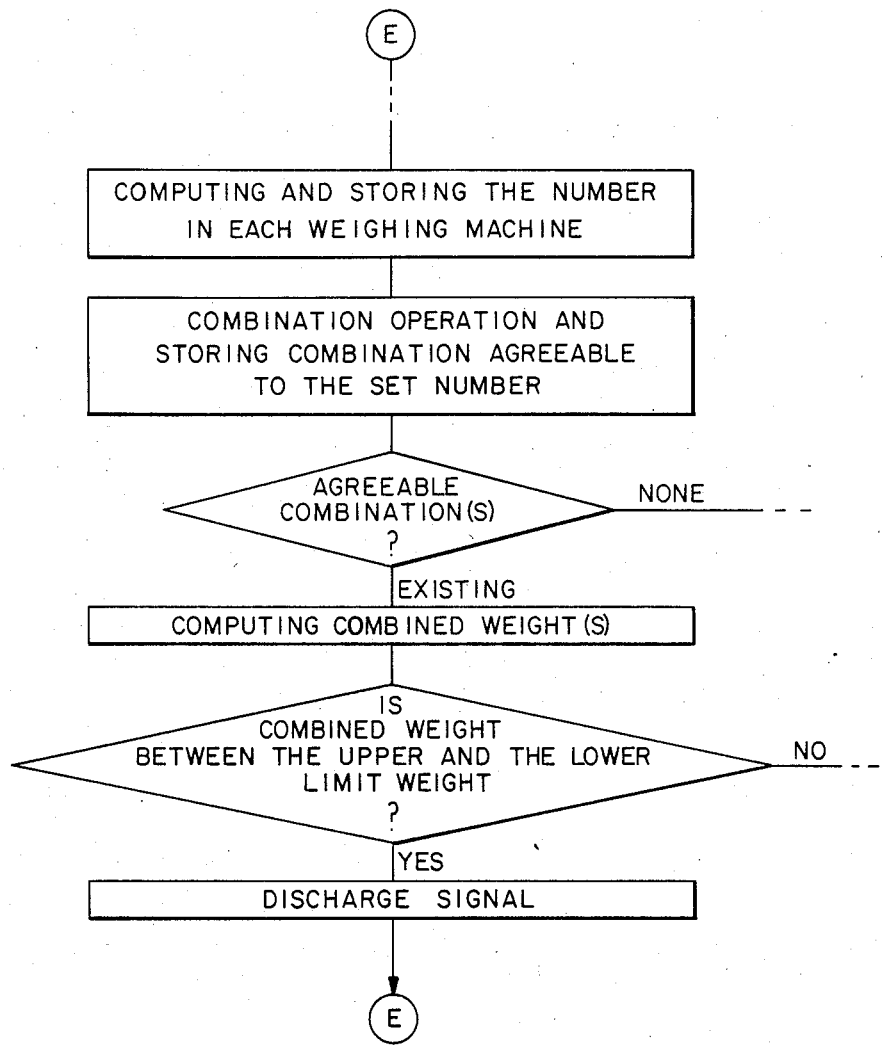
FIG. — II

METHOD OF WEIGHTING AND COUNTING

This is a continuation of application Ser. No. 611,397, filed May 18, 1985, which is a continuation of application Ser. No. 355,597, filed Feb. 16, 1982, now abandoned.

This invention relates to a weighing method of a high precision to select a combination of goods equal or approximately equal in total weight to the set value among a number of goods having variations in the unit weight.

Conventionally, objects to be weighed and having variations in the unit weight are placed one by one on a scale pan, and when the measured weight approaches the set weight, the last one is placed to finish the weighing. Such method, however, is defective in that a larger error will be produced when the unit weight is larger in dispersion and an average unit weight is larger, because, for example, in a case that the unit weight of weighed goods is dispersed in a range of 20 to 45 g and a measured weight of the weighed goods is 195 g with respect to the set weight value of 200 g, if a good of a 45 g unit weight is sequentially added, a total weight becomes 240 g, resulting in an excess of 40 g weight at the finish of weighing.

In the light of the above defect, this invention has been designed and directed to an accurate weighing such that a number of weighing machines weigh goods at every small amount and all the measured weights are combinational-added so that a combination of combined weight equal to or nearest the set weight is obtained, thereby discharging the weighed goods corresponding to the obtained combination from the weighing machines.

The present invention, in a case that a proper number of goods are taken out of a large number of goods to be weighed so as to be weighed and discharged by an amount of the set weight, enables the weighing of an extremely high accuracy even when the weighed goods are larger in the unit weight and in dispersion, or relatively smaller in the set weight in comparison with the unit weight.

Also, this invention relates to a counting method for goods, such as bolts or nuts, having somewhat variations in weight, and more particularly to a method for counting a total weight of a number of weighed goods, the total weight being divided by the unit weight of each good to obtain the number of the goods. An object of the invention is to provide a counting method such that a plurality of weighing machines each weigh a plurality of goods in a small number at a time to obtain the number of goods by the above division, the obtained numbers being properly combined so that the predetermined number of counted goods can be discharged with accuracy.

Conventionally, a counting method, when one kind of counted goods are bagged in a given number, discharges the goods separately one by one from, for example a part feeder and detects the passing goods one by one by use of a photo-senser, thereby counting the number of the discharged goods. In other words, a counter counts pulse generated from the detector every time one good passes and a comparator decides whether the goods reach the number set by a digital switch or the like, so that, for example, if the set number is one hundred, a signal output from the comparator stops the part feeder when the counter counts one hundred pieces, thereby carrying out bagging work. Such conventional method is suitable if the counted goods easily move separately one by one and are simple in shape, but is inadequate for goods, such as springs or eye-bolts, because the springs are apt to twist together and two may be counted as one, or one eye-bolt because of its shape may be counted as two.

In order to eliminate the above defect, this invention has been designed to provide an improved counting method. In detail, the counting method, which weighs in total an unknown number of the same kind of goods to be counted so that the total number is divided by a unit weight of the respective goods to thereby obtain the number thereof, is applied to count a small number of goods at a time by use of n sets of weighing machines, thereby combinational-adding entirely the number of goods at every weighing machine to obtain the combination of the number coincident with the desired number of goods and discharging the counted goods at weighing machines corresponding to the obtained combination, thus measuring with accuracy a desired number of the counted goods.

The present invention once counts the combined number as to all the combinations and thereafter selects combinations to be discharged under a particular condition. Hence, the invention can be classified into the following three embodiments according to the selecting condition.

A first embodiment selects a combination of the goods discharged under a condition that the computed combined number is equal to or nearest the set number.

A modified embodiment or second embodiment selects a combination discharged under a condition that the computed combined number is equal to or nearest the set number and combined weight of the combination is equal to or nearest the set weight.

Another modified embodiment or third embodiment selects a combination of the goods discharged under a condition that one of the computed combined number and combined weight is equal to or nearest the set value and the other is a combination included within a range of a set error or both the combined number and combined weight are included in the set error.

In other words, the invention can count the number of goods with high accuracy and capability by weighing goods separately thrown into n sets of weighing machines and by dividing the weighed data by a unit weight of each good to get the number of goods to thereby obtain a combination to meet the above condition among all the combinations. Also, since the total weight is divided by the unit weight to change the weight to the number of goods, the goods, even complex in shape or twisting, can facilitate the counting without hindrance.

Figure 6:
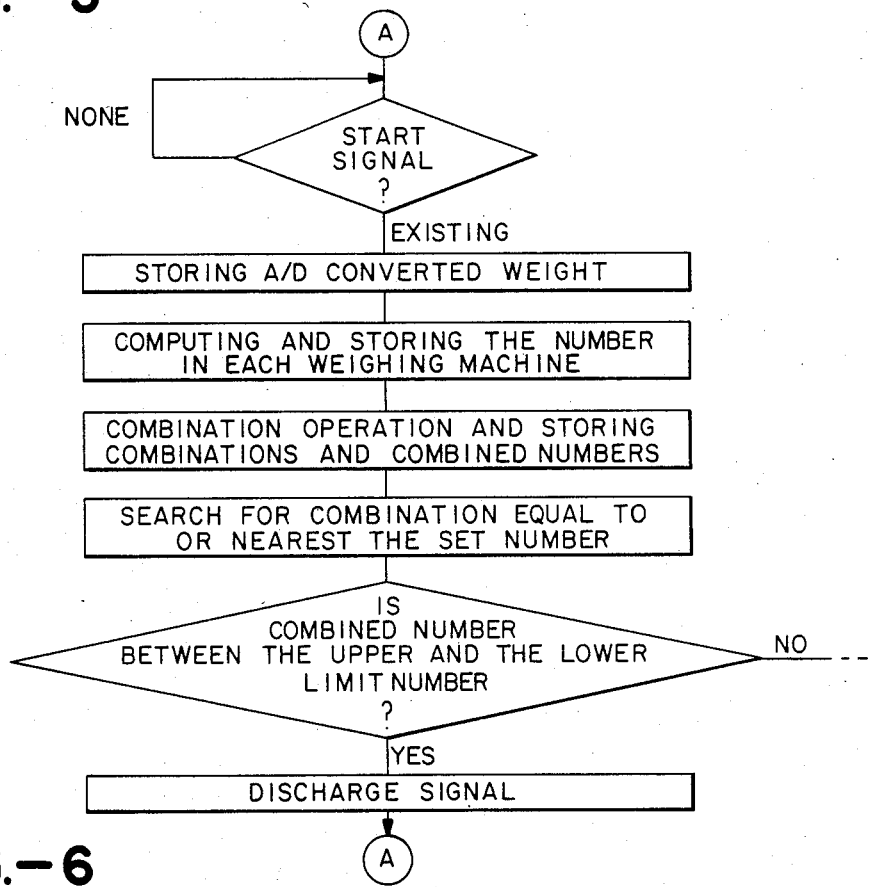
Figure 7:
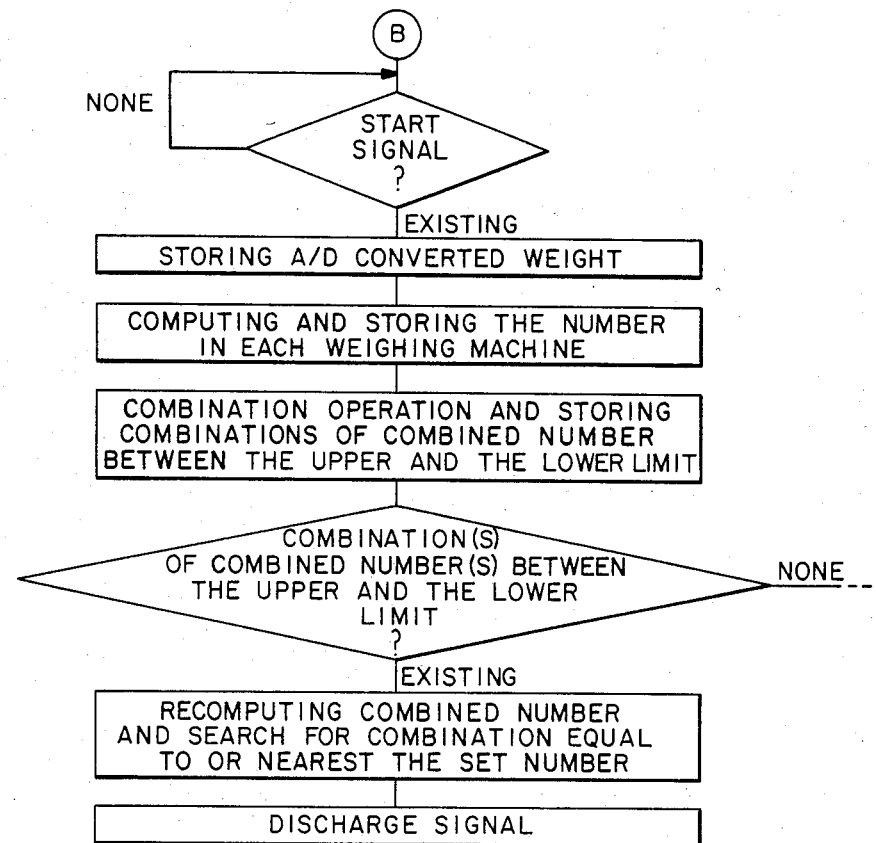
Figure 8:
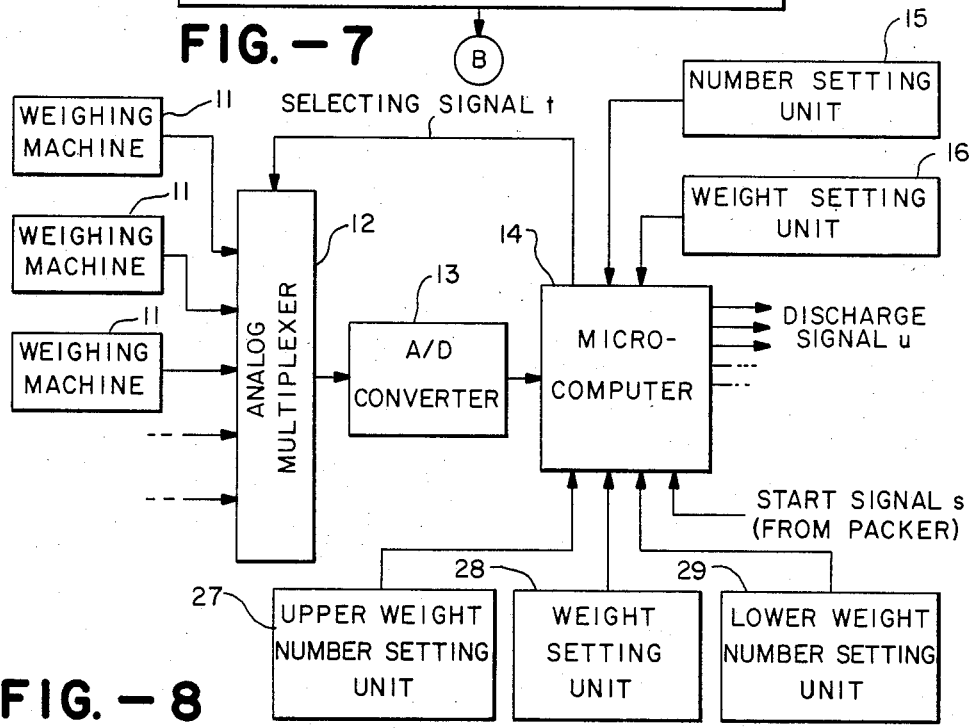
Figure 9:
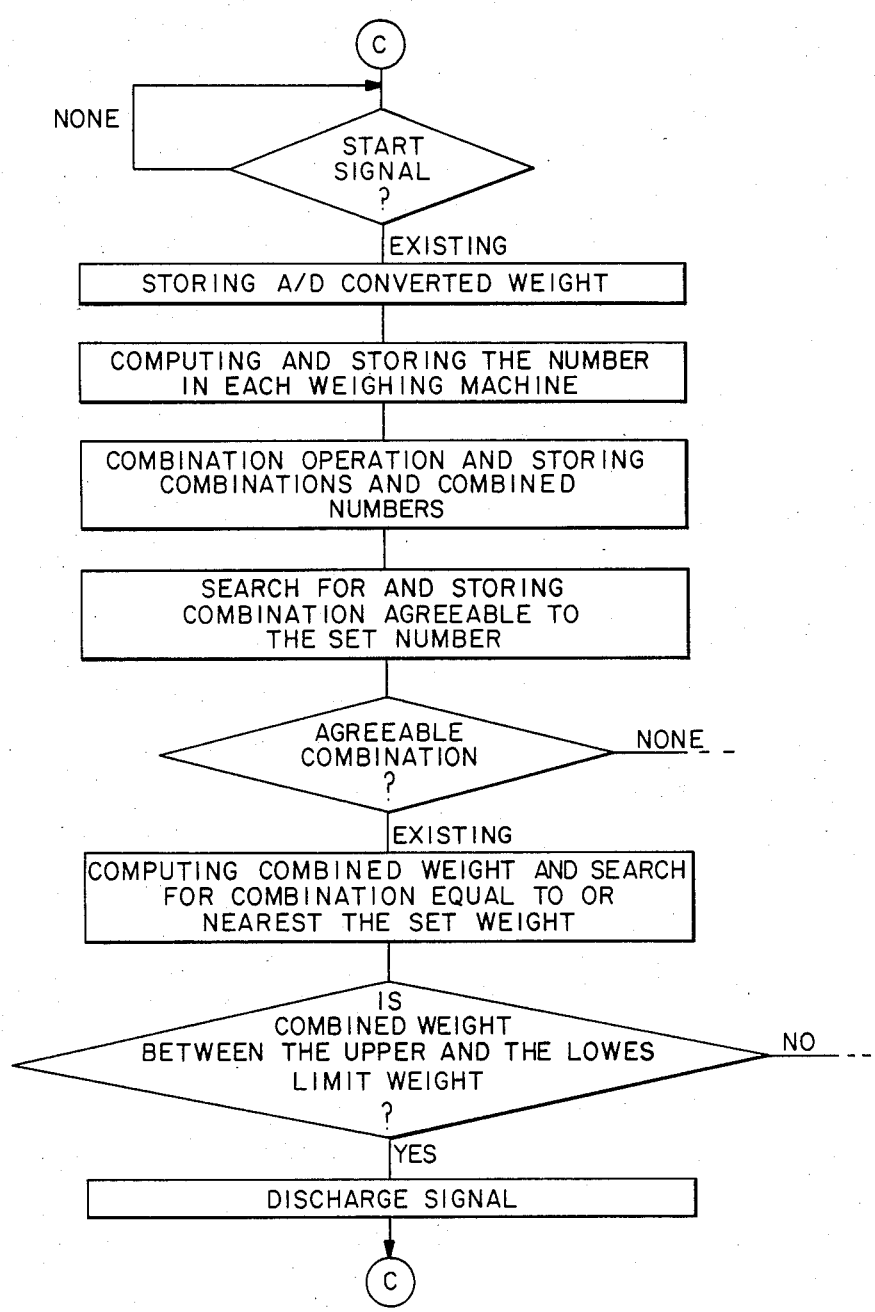
Figure 10:
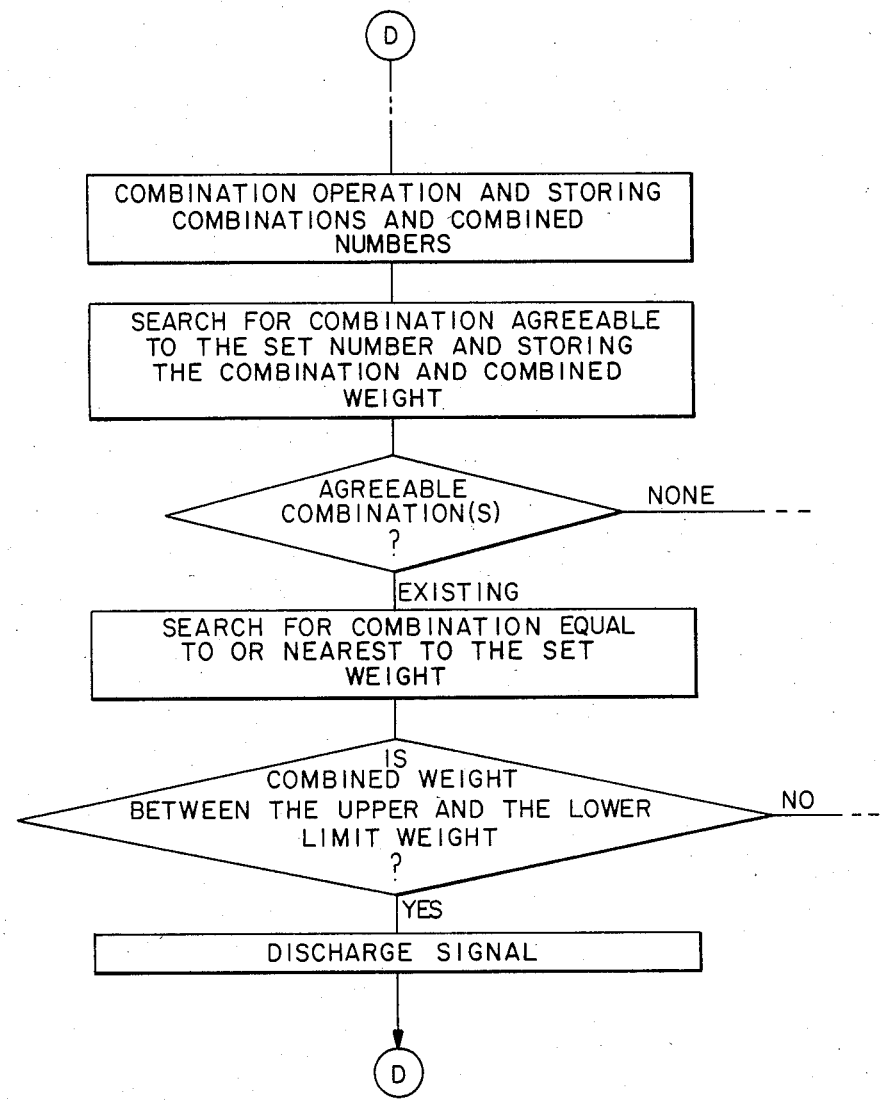

The above and other related objects and features of the invention will be apparent from a reading of the following detailed specification and drawings, in which:

FIG. 1 is a block diagram of an exemplary construction of a device used for a weighing method of the invention, FIGS. 2 through 4 are flow charts of exemplary process steps by a microcomputer in FIG. 1, FIG. 5 is a block diagram of an exemplary construction of a device used for a counting method of the invention, FIGS. 6 and 7 are flow charts showing exemplary process steps by a microcomputer in FIG. 5, FIG. 8 is a block diagram of a modified embodiment of the FIG. 5 device, and FIGS. 9 through 11 are flow charts showing exemplary process steps by a microcomputer in FIG. 3.

FIG. 1 represents an embodiment of a combinational weighing device of the invention using a microcomputer, in which reference numeral 1 designates a plurality of weighing machines, 2 designates a microcomputer, 3 designates a multiplexer which is given a selective signal (a) from microcomputer 2 to allow weighing data output from weighing machines 1 to selectively pass through multiplexer 3 and comprises an analog switch or the like, 4 designates an A/D converter receiving the weighing data given from multiplexer 3 and converting it into a digital signal, 5 designates a weight setting unit to give the set weight into microcomputer 2, 6 designates an upper limit weight setting unit given an upper limit weighing value, and 7 designates a lower limit weight setting unit given a lower limit weighing value.

This device functions as follows:

Each weighing machine 1 is supplied with weighed goods from a feeder so as to properly disperse the weight of goods. These goods are weighed to be given simultaneously to multiplexer 3 as the weighing data from each weighing machine 1. Microcomputer 2, when given a start signal generated by a packer upon completion of packing preparation, starts its operation. In other words, selective signal (a) is sequentially changed-over to be sent to multiplexer 3 so that the weighing data output from each weighing machine 1 is forcibly passed through multiplexer 3 and converted into a digital signal by A/D converter 4, thereby being stored within microcomputer 2. On completion of storage of all the weighing data due to changeover of selective signal (a), each weighing datum is added in combination regarding all combinations of respective weighing machines 1 to compute combined weight. From the results of the combinational computing, only one combination of weight equal to or nearest the set weight set by weight setting unit 5 and a discharge signal (b) for weighed goods is output to each weighing machine 1 corresponding to said combination, thereby discharging said weighed goods from weighing machines 1 and feeding them to the packer, thus obtaining an amount of goods of the set weight measured with accuracy. Alternatively, from the above results, the weighed goods may be discharged correspondingly to the set weight after checking whether the combined weight of the selected combination is included in a range of the predetermined error. In this case, upper limit weight setting unit 6 has set an upper limit value including an allowable error, and lower limit weight setting unit 7, a lower limit value including an allowable error. After checking whether the selected combined weight is in a range of the upper and lower limit values, if not, for example, an alarm sounds to forbid weighing machines 1 to discharge weighed goods.

In the above construction, the process within microcomputer 2, which reads the weighing data from each weighing machine 1 and once computes all the combinations and thereafter allows weighing machines 1 to discharge the weighed goods, includes two cases of selecting the combined weight equal to or nearest the set weight and of selecting the combined weight as the above where the weight is also between the upper and lower limit weights. The processes under the above conditions are carried out when the combined weight is stored entirely or partially. Combinations of selective conditions and storage method can propose various process means, the embodiments of which will be detailed as follows:

A first embodiment of the process method of the invention is shown in FIG. 2, in which a waiting loop at first is repeated until a start signal (S) is given from the packer. Upon receipt of start signal (S), all weighing data of each weighing machine 1 are analog-digital-converted to be read in microcomputer 2 and stored therein. Next, all combinations of each weighing datum are combinational-added, the combined weight of which and said combinations, are entirely stored in microcomputer 2, and then only one combination equal to or nearest the set value is selected from the combined weight. Lastly, the combined weight of the selected combination is checked for whether it is included between the upper and the lower limit weights. If not, a buzzer or the like sounds an alarm to forbid weighing machines 1 to discharge the weighed goods, and if included, a discharge signal (b) corresponding to the searched combination is output to weighing machines 1.

In addition, in a case that it is enough to search whether the combination is equal to or nearest the set value and unnecessary to include the combined weight between the upper and the lower limits, the device of the first embodiment may output discharge signal (b) without judgement of whether the combined weight is included between the upper and the lower limits.

FIG. 3 represents the second embodiment of the process method of the invention, in which the weighing data stored in micro-computer 2 is operated in combination with respect to all the combinations, the combinations and combined weight being once stored similarly to the first embodiment. Next, the microcomputer 2 searches for a combination having its combined weight between the upper and lower limit weights, the combination and combined weight being again separately stored, and then decides whether or not the combination has its combined weight between the upper and the lower limit weights. If not, a buzzer or the like sounds an alarm to forbid weighing machines 1 to discharge the weighed goods. If so, only one combination equal to or nearest the set value is selected from the stored combinations, thereby outputting discharge signal (b) to weighing machines 1 according to the selected combination.

Alternatively, the second embodiment, in the process of selecting the combination having its combined weight between the upper and the lower limit weights and of storing the combination and combined weight, may not store all combination but only a desired number, for example, 20 sets only. In such case, an effective reduction of operation time at the later process is obtained. Also, the second embodiment may alternatively decide whether the combined weight is included between the upper and the lower limit weights simultaneously every time all the combinations are computed in combination, thereby storing only combinations and combined weights which meet these conditions.

A third embodiment of the process method will be shown in FIG. 4.

This embodiment, similarly to the former embodiment, analog-digital-converts all weighing data of each weighing machine 1 and stores them in microcomputer 2. Thereafter, all the combinations are computed in combination so that the combination only having its combined weight between the upper and the lower limit weights is stored. Next, microcomputer 2 decides whether or not the combination stored under the above condition exists, so that, if not, the buzzer sounds an alarm to forbid weighing machines 1 to discharge the weighed goods. If such condition does exist, the stored combinations are recomputed and combined weight to select only one combination of combined weight equal to or nearest the set weight, thus outputting discharge signal (b) to weighing machines 1 according to the selected combination.

Next, an exemplary construction of a device for a counting method of the invention will be shown in FIG. 5.

In the drawing, reference numeral 11 designates weighing machines to which counted goods having moderate variations in weight are supplied from the feeder, 12 designates an analog multiplexer through which the weighing data from each weighing machine 11 is allowed to selectively pass, 13 designates an A/D converter converting an analog signal into a digital signal, 14 designates a microcomputer which sends a selective signal (t) to analog multiplexer 12, sequentially reads the weighing data of each weighing machine 11 and stores it, and carries out an operation process or the like on a basis of data of the set number of discharged goods, 15 designates a number setting unit for setting at microcomputer 14 the number of discharged goods, 16 designates a unit weight setting unit for setting at microcomputer 14 and the unit weight of each good, 17 designates an upper limit number setting unit for setting at microcomputer 14 the upper limit of errors in the number of discharged counted goods, and 18 designates a lower limit number setting unit for setting at microcomputer 14 the lower limit of error in the number of the same goods.

The FIG. 5 embodiment operates as follows: Each weighing machine 11 is supplied from the feeder goods to be counted and having moderate variations in weight, and weighs them, each weighing datum being output to analog multiplexer 12, where microcomputer 14 starts its counting operation when start signal (S) generated upon completion of packing preparation by the packer is given to microcomputer 14. In other words, selective signal (t) is sent to analog multiplexer 12 to pass the weighing data output from weighing machines 11 sequentially through analog multiplexer 12, the data being converted into a digital signal by A/D converter 13 and stored in microcomputer 14. Upon finish of storage of all weighing data by changing-over selective signal (t), each weighing datum is divided by the unit weight set by unit weight setting unit 16, thereby computing the number of counted goods. All the combinations of the respective number are added in combination to select a combination of the combined number which meets the data set by the number setting unit 15 and the upper limit and lower limit number setting units 17 and 18. Weighing machines 11 corresponding to said combination are given a discharge signal (u) to discharge the goods, thereby obtaining a desired number of goods.

In the embodiment, the operation process program at microcomputer 14 is considered to include the following three methods due to a storage method by the pre-process after all the combinations are combinational-computed.

In a first case 1-X, all the combinations of numbers are combinational-computed and all of the combination and the combined numbers are stored, and then the process is carried out.

In a second case 1-Y, all the combinations of numbers are combinational-computed and only the combined number equal to or nearest the set number is kept.

In the third case 1-Z, all the combinations are combinational-computed and only those combinations of the combinational number within the set error, or combinations within the set error and equal to or nearest the set number, are stored and kept.

Now, the process steps where the embodiment is operated by the process program in the case 1-X will be described according to a flow chart in FIG. 6. At first, microcomputer 14 checks whether or not start signal (S) is given from the packer, and repeats its waiting loop until decision of existing of start signal (S). Microcomputer 14, when given start signal (S), decides its existing to sequentially send selective signals (t) to analog multiplexer 12 and reads the weighing data from each weighing machine 11 in digital signal through analog multiplexer 12 and A/D converter 13, thereby storing the data. Next, the weighing data is divided by the unit weight of counted goods set by unit weight setting unit 16, the guotient being counted as one fractions of more than 0.5 inclusive and cut away the rest so as to be made integral, whereby the number of counted goods at each weighing machine 11 is computed to be stored. In succession, all the combinations of the number are combinational-computed and the combination numbers corresponding to each combination are separately stored, then one set of combination equal to or nearest the set number set by number setting unit 15 is searched on a basis of the above storage. Microcomputer 14 decides whether or not the combinational number of the combinations obtained by the search exists within a range of an error set by the upper and lower limit number setting units 17 and 18, in other words, between the upper and the lower limit numbers. If out of the range, signal of NO is output to stop the counting operation and an alarm buzzer or pilot lamp indicates the impossible counting. If within the range and YES is decided, the discharge signal to the weighing machines corresponding to the above combination is sent to discharge the counted goods thereof, thus completing one counting operation.

The process program in the case 1-Y is that after the number of counted goods at each weighing machine 11 is computed and stored through the process in FIG. 6, all the combinations are combinational-computed to obtain the combination of the number equal to or nearest the set number to thereby store these combinations. Hence, it is decided whether the combined number of the stored combinations exists within the set error, i.e., between the upper and the lower limit numbers, so that discharge signal (u) is output to weighing machines 11 corresponding to one set of combinations existing between the upper and the lower limit numbers. Alternatively, the process methods in the cases 1-X and 1-Y may discharge the counted goods through one set of combinations of the number equal to or nearest the set number without deciding whether the combination exits between the upper and the lower limit numbers, where the upper limit and lower limit number setting units 17 and 18 are of course unnecessary.

The process program in the case 1-Z carried out as shown in the FIG. 7 flow chart. In detail, after each weighing datum is read and stored similarly to the program in FIG. 6, the combination of the combined number only between the upper and the lower limit numbers is stored every time the number is computed and stored and all the combinations are combinational-computed of the number, thereby deciding whether or not the stored combination is included between the upper and lower limit numbers. If decided not to be included, the counting operation is stopped, and if included, the combined number is recomputed according to the stored combination and one combination of the number equal to or nearest the set number is searched to be kept, so that the discharge signal is output to hte weighing machines corresponding to said combination, thereby discharging the counted goods. In addition, when the process method 1-Z stores the combination between the upper and the lower limit numbers, the combined number corresponding to the combination may simultaneously be stored. Hence, the combined number of the combination between the upper and lower limit numbers in the FIG. 7 flow chart, need not be recomputed. In the process methods in the cases 1-Y and 1-Z, the combinations whose combined numbers in the primary combinational computation meet the predetermined condition, e.g., of existing between the upper and the lower limit numbers, need not inevitably store all the combinations, but may store a desired number of combinations, thus reducing the later operation time.

The combination selected and lastly obtained by each embodiment is deemed to be classified into condition of (i) or (ii).

In other words, the combination is condition (i) has the combined number equal to or nearest the set number and between the upper and lower limit numbers. The combination in condition (ii) is equal to or nearest the set number.

Next, a modified embodiment of the invention shown in FIG. 5 will be described, in which all the combinations are computed of the combined numbers, and thereafter the goods are discharged under the condition that the combined number is equal to or nearest the set number and the combined weight equal to or nearest the set weight.

An exemplary construction of a device for carrying out the above operation is shown in FIG. 8, in which an upper limit weight setting unit 27 and a lower limit weight setting unit 28 are substituted for the upper and lower limit number setting units 17 and 18 in FIG. 5 and a weight setting unit 29 is newly added, the rest being the same as in FIG. 5.

The operation process program of the microcomputer, when the modified embodiment is put in practice, is mainly divided into the following two kinds of combinations by the storage method in the preprocess after all the combinations are combinational-computed.

In a case 2-X, all the combinations are combinational-computed of the number so that the combination to meet a condition of all or the predetermined number, or the combination and combined number, are stored to carry out the later process.

In another case 2-Y, all the combinations are combinational-computed of the number, so that the combination to meet conditions of all or the predetermined number and/or weight, and the combined weight, are stored to carry out the later process.

An exemplary process steps of operating the construction in FIG. 8 by use of the process program in the case 2-X will be detailed in accordance with the FIG. 9 flow chart. At first, microcomputer 14 checks whether or not start signal (S) is given from the packer and repeats the waiting loop until a decision of the start signal (S) given. Upon input of start signal (S), microcomputer 14 decides the existing thereof to send selective signal (t) to analog multiplexer 12, reads weighing data from each weighing machine 11 in digital signal through analog multiplexer 12 and A/D converter 13, and stores the data. In succession, the set unit weight divides the weighing data and the quotient counts as one fractions more than 0.5 inclusive and cut away the rest, and is made integral, so that the number of counted goods weighed by weighing machines 11 are computed and stored. Thereafter, all the combinations are combinational-computed and the combined number and said combination are separately stored. Next, combination coincident with the set number is searched and the coincident combinations are stored. Furthermore, microcomputer 14 decides whether or not the combination coincident with the set number exists, i.e., whether or not the coincident combination is stored. When decided not to exist, microcomputer 14 stops the counting operation and the buzzer alarms the impossible counting. On the other hand, when decided to exist, all the combinations restored are computed of the combined weight, so that combination equal to or nearest the set weight is searched, thereby selecting only one set of combinations of the combined number equal to the set number and of the combined weight equal to or nearest the set weight. Then, microcomputer 14 decides whether or not the combined weight of the combination is included between the upper and lower limit weights set by the upper and lower limit weighing units 27 and 28. If NO, the counting operation is stopped similarly to the above, and if YES, since the selected combinations meet a given condition, weighing machines 11 corresponding to the combinations are given discharge signal (u), thereby discharging the predetermined number of goods.

Alternatively, the process program in the case 2-X, when combinational-computed, may simultaneously decide whether or not the combination coincides with the set number, so that the coincident combination only may be stored. In the case 2-X, the process program need not decide whether or not the last combined weight exists between the upper and lower limit weights. Hence, the upper limit and lower limit weight setting units 27 and 28 are of course unnecessary.

The storage in preprocess at the process program in the case 2-X, which stores the combination whose combined number coincides with the set number in the embodiment in FIG. 9, may alternatively be deemed to include ① storage of the combination nearest the set number and of the combined number, and ② storage of the combination and combined number between the upper and lower limit numbers, or equal to or nearest the set number. The above embodiment once unconditionally stores all the combinations and combined number and then restores the combinations to meet a given condition, among all the combinations, but may, without the restorage, search to obtain one set of combinations among all the primarily stored combinations, the one set of combinations meeting the last conditions of being equal to or nearest the set number and equal to or nearest the set weight. The case of no restorage after storage unconditional of all the combinations and combined numbers is designated by ③. Such preprocess computes the combined weight always later.

In addition, the combined number need not be stored in the case ① of no later check of combined number existing between the upper and lower limit numbers, and in the case ② that the combined number is equal to or nearest the set number between the upper and lower limit numbers.

The process program in the case 2-Y is performed, for example, as shown in the FIG. 10 flow chart. In detail, each weighing datum, as the same as the FIG. 9 program, is read and stored, the number is computed, and the combined number and combinations. Next, the combination coincident with the set number is searched and combinational-computed of weight, so that these combinations and combined weight are stored. In succession, the microcomputer decides whether or not the coincident combination is stored, and if no combination is stored, stops the counting operation under a decision of impossible counting, thereby giving an alarm, and if the coincident combination existence is decided, searches to obtain one set of combinations equal to or nearest the set weight among these combinations, thereby deciding whether or not the combined weight of the obtained combination exists between the upper and lower limit weights. Upon a decision of NO, the counting operation is stopped similarly to the above and upon a decision of YES, weighing machines 11 corresponding to said combination, under the satisfactory conditions, are given the discharge signal to diacharge the predetermined number of counted goods.

The storage method in preprocess at the program of the case 2-Y, which stores the combination of combined number coincident with the set number and the combined weight in the FIG. 10 embodiment, may alternatively include some kinds of storages. In other words, numeral ④ represents a case of storing the combined weight as well as the combination and combined number in the former case ③. ⑤ represents a case of storing under a condition of the number the combination and combined number and combined weight, nearest the set number, between the upper and lower limit numbers, or equal to or nearest the set number between the upper and lower limit numbers. ⑥ represents a case of storing under a condition of weight the combination equal to the set weight and the combined number. ⑦ represents a case of storing under a condition of weight the combined weight and combined number and combination thereof, the combined weight being nearest the set weight, between the upper and lower limit weights, or equal to or nearest the set weight. Storages under a condition of the number and weight in coupling are proposed by the following cases ⑧ through ⑯. In the case ⑧, the combination between the upper and lower limit weights and between the upper and lower limit numbers, the combined weight, and the combined number, are stored. In the case ⑨, the combination between the upper and lower limit weights and equal to or nearest the set number, the combined weight, and the combined number (no need if in condition of being equal to the set number), are stored. In the case ⑩, the combination between the upper and lower limit numbers and equal to or nearest the weight, the combined number, and the combined weight (no need if in condition of being equal to the set weight), are stored. In the case ⑪, the combinations or the like are stored under a condition of being equal to or nearest the set number between the upper and lower limit weights and between the upper and lower limit numbers. In the case ⑫, the combinations or the like are stored in condition of being equal to or nearest the set weight between the upper and lower limit numbers and between the upper and lower limit weights. In the case ⑬, the combinations or the like are stored in condition of being equal to or nearest the set weight, and of having the combined number equal to or nearest the set number and between the upper and lower limit numbers. In the case ⑭, the combinations or the like are stored in condition of being equal to or nearest the set number and equal to or nearest the set weight between the upper and lower limit weights. In the case ⑮, the combinations or the like are stored in condition of being equal to or nearest the set weight and equal to or nearest the set number. In the case ⑯, the combinations or the like are stored in condition of being equal to or nearest the set number between the upper and lower limit numbers and equal to or nearest the set weight between the upper and lower limit weights. Among the above cases ⑤ through ⑯, the cases that the combinations are in condition of being equal to the set value, that the combinations are in condition of being nearest the set value and of no later check between the upper and lower limits, and that the combinations are in condition of being equal to or nearest the set value, need not store the corresponding combined numbers and combined weight.

In addition, at the modified embodiment, the combined weight may be computed simultaneously with computation of the combined number, or may be done after computation of the combined number (during the searching in the later process). The above simultaneous computation is put in practice in the case ④ of storage free from the above condition. The later computation is carried out in a case of the above 2-X program shown by the FIG. 9 flow chart.

The exemplary programs in FIGS. 9 and 10, after storage of the preprocess, check whether or not the combined weight is within a range of the upper and lower limit weights, which check may alternatively be carried out prior to the storage operation in the preprocess and such condition of being between the upper and lower limit weights may be neglected.

Alternatively, in the modified embodiment, the condition of being between the upper and lower limit numbers may or not be added and may be in any position.

Also, in a case that the condition of being coincident, nearest or between the upper and lower limits, is made during the storage at the preprocess in the modified embodiment, a desired number of combinations among the combinations to meet the above conditions may be stored.

In addition, combinations selected by the above modified embodiment to be lastly obtained are classified into either (a), (b), (c) or (d) having the following condition.

In detail, (a) is equal to or nearest the set number and equal to or nearest the set weight. (b) is equal to or nearest the set number between the upper and lower limit numbers and equal to or nearest the set weight. (c) is equal to or nearest the set number and equal to or nearest the set weight between the upper and lower limit weights. (d) is equal to or nearest the set number between the upper and lower limit numbers and equal to or nearest the set weight between the upper and lower limit weights.

Next, the second modified embodiment of the invention will be described, which obtains the combination discharged under the condition that after computation of the combined numbers regarding all the combination, one of the combined number and combined weight is equal to or nearest the set value and the other is included within the set error, or both the combined number and combined weight are kept within the set error.

The second modified embodiment can use the FIG. 8 device shown as the modified embodiment, which will be detailed in accordance with FIG. 8.

The operation process program at microcomputer 14 to put another embodiment in practice are mainly divided into the following three kinds under the condition of the last combination obtained after computing all the combinations.

In a case 3-X, all the combinations are combinational-computed of the number to obtain the combination of the combined number equal to or nearest the set number and of the combined weight between the upper and lower limit weights.

In a case 3-Y, the combination of the combined weight equal to or nearest the set weight and of the combined number between the upper and lower limit numbers is obtained.

In a case 3-Z, the combination of the combined number between the upper and lower limit numbers and of the combined weight between the upper and lower limit weights is obtained.

Now, an exemplary process program when the embodiment in FIG. 8 is operated by the above 3-X process program, will be detailed according to the FIG. 11 flow chart. At first, each weighing datum, as the same as the program in FIG. 9, is read to compute the number and store it, and thereafter, every time the combinational operation gives the combined number, the combination coincident with the set number is stored. Continuously, the microcomputer decides whether or not the coincident combination exists, that is, whether or not the combination is stored, so that when decided none, the counting is decided to be impossible and the counting operation is stopped and gives an alarm. When deciding the coincident combination exists, the microcomputer computes the combined weight of the combination to decide whether or not it is included between the upper and lower limit weights. As a result, the microcomputer, when deciding all the combined weights are NO, decides the counting is impossible to stop the counting operation, but when deciding one set or more are YES, sends discharge signal (u) to weighing machine 11 corresponding to a desired one set of combinations meeting the conditions, thereby discharging the predetermined number of counted goods. Incidentally, the above embodiment stores the combination only coincident with the set number, but simultaneously, the combined weight of the combination coincident with the set number may be computed to store the combination and combined weight thereof.

In the process program of 3-X, the storage at the preprocess in the FIG. 11 embodiment, is for the combination of the combined number coincident with the set number, but besides this, some cases of the storages are considered, that is, the respective cases ①, ②, ③, ④, ⑤, ⑧, ⑨ and ⑪ under the storage conditions at the first modified embodiment and the case ⑦′ of storing the combination between the upper and lower limit weights, combined weight, and combined number.

In this instance, combinations selected by the process of 3-X to be at last obtained are classified into those having the following condition (e) or (f).

(e) represents the combination equal to or nearest the set number and between the upper and lower limit weights. (f) represents the combination equal to or nearest the set number and between the upper and lower limit weights.

The process program in 3-Y is omitted of its explanation, but the storage methods are preprocess are proposed as follows: the storage method under the conditions ③, ④, ⑥, ⑦, ⑧, ⑩ and ⑫ used in the first modified embodiment, that ②′ of the combination and combined number between the upper and lower limit numbers, and that ⑤′ of the combination and combined weight between the upper and lower limit numbers. In addition, in the storage method ②′, the combined weight may be obtained at a necessary place.

The combinations selected by the process of 3-Y to be lastly obtained can be classified into those having the following condition (g) or (h):

(g) represents the combination equal to or nearest the set weight and between the upper and lower limit numbers. (h) represents the combination equal to or nearest the set weight between the upper and lower limit weights and also between the upper and lower limit numbers.

The process program of 3-Z will be omitted of its explanation, but the storage methods at preprocess are proposed as follows: the storage under conditions ③ and ④ used in the first modified embodiment, that ⑰ of the combination between the upper and lower limit numbers or of said combination and combined weight, that ⑱ of the combination between the upper and lower limit weights or of said combination and combined number thereof, and that ⑧′ of the combination between the upper and lower limit numbers and between the upper and lower limit weights.

In addition, the combination selected by the process of 3-Z to be lastly obtained has a condition (i) as follows:

(i) represents the combination between the upper and lower limit numbers and between the upper and lower limit weights.

The process in the second modified embodiment may check whether or not the combined weight is included within a range of the upper and lower limit weights either before or after the storage at the preprocess, and the process of 3-Y may not check the above. The process of 3-X may not add the condition of the upper and lower limit numbers, and those of 3-Y and 3-Z may be carried out at a desired time. During the storage at the preprocess, in a case that the set value is conditioned on being equal to, nearest, or between the upper and lower limits, all or a desired number of combinations meeting the above condition can be stored. These processing conditions are similar to those at the first modified embodiment. The storage methods of the FIG. 5 embodiment, first modified embodiment and second modified embodiment, include storage of combined number and combined weight as well as the combination, in which the latter at least may be stored. In this case, however, the combined number and/or combined weight not stored must be redetected when searched.

Alternatively, each storage method meeting the predetermined condition may once carry out the combinational operation as to all the combinations and store them, among which the combination or the like meeting the predetermined may be restored, or the combination only meeting the predetermined condition may be stored every time the combinational operation is carried out as to all the combinations. Hence, in the former case, the storage at the preprocess is twice carried out, and once in the latter case.

Lastly, the above description will be classified by the storage method at the preprocess and the conditions on the lastly obtained combinations or the like and shown in Table 1 as follows:

TABLE 1

| | FIG. 5 Embodiment (FIG. 5) | | 1st Modified Embodiment (FIG. 8) | | | | 2nd Modified Embodiment (FIG. 8) | | | | |
|---|---|---|---|---|---|---|---|---|---|---|---|
| Storage Method at Preprocess | 1-X (FIG. 6) 1-Y 1-Z (FIG. 7) | | 2-X (FIG. 9) 2-Y (FIG. 10) | | | | 3-X 3-Y 3-Z (FIG. 11) | | | | |
| Last Discharge Condition | i | ii | a | b | c | d | e | f | g | h | i |
| Equal to or Nearest the Set Number (A) | o | o | o | o | o | o | o | o | | | |
| Equal to or Nearest the Set Weight (B) | | | o | o | o | o | | | o | o | |
| Between the Upper and Lower Limit Numbers (C) | | o | | o | | o | o | o | | o | o |
| Between the Upper and Lower Limit Weights (D) | | | | | o | o | o | o | | o | o |

In other words, the last obtained combinations are conditioned on (A) being equal to or nearest the set number, (B) equal to or nearest the set weight, (C) between the upper and lower limit numbers, and (D) between the upper and lower limit weights. These conditions (A), (B), (C) and (D) are combined mutually to lastly obtain two of (i) and (ii) in the FIG. 5 embodiment, four of (a), (b), (c) and (d) in the first modified embodiment, and five of (e), (f), (g), (h) and (i) in the second modified embodiment.

Furthermore, in the aforesaid inventions, all the combinations are combinational-computed to be stored as the preprocess, which are divided mainly into two as follows:

One is to store the combinations unconditionally as the process of FIG. 5 embodiment, and the other is to store them selected prior to storage under a part or all of the conditions for the last obtaining.

In addition, the aforesaid respective inventions describe that the set errors in the number and weight are included between the upper and lower limits, which of course include the case that the error is set within a range of the upper limit only or the lower limit only.

Although several embodiment have been described, they are merely exemplary of the invention and not to be constructed as limiting, the invention being defined solely by the appended claims.

What is claimed is:

1. The method of obtaining a combination of articles of a target number comprising the steps of:
   weighing groups of articles with a plurality of weighing machines;
   converting analog output signals from the weighing machines into digital signals in succession for storage in a microcomputer;
   dividing the weight of the articles in each group by a unit weight of article to find the number of articles therein;
   computing the sum of number of articles for every combination of said groups of articles;
   storing all or part of the combinations;
   selecting a particular combination from among the stored combinations having the sum of number of articles equal to or nearest a preset number; and
   discharging the articles from those weighing machines corresponding to the particular combination.

2. The method as defined in claim 1, wherein the articles are discharged provided the sum of number of articles in those weighing machings corresponding to the particular combination falls between upper and lower limits.

3. The method as defined in claim 1, wherein the combinations are stored in terms of the combination and the sum of number of articles.

4. The method as defined in claim 1, wherein the combinations are stored in terms of the combination only and that the sum of number of articles is re-computed before selecting a particular combination.

5. The method of obtaining a combination of articles of a target number comprising the steps of:
   weighing groups of articles with a plurality of weighing machines;
   converting analog output signals from the weighing machines into digital signals in succession for storage in a microcomputer;
   dividing the sum of weight of articles in each group by a unit weight of article to find the number of articles therein;
   computing the sum of number of articles for every combination of said groups of articles;
   storing all or a part of the combinations;
   selecting a particular combination from among the stored combinations that has the sum of number of articles equal to or nearest a preset number and the sum of weight equal to or nearest a preset weight; and
   discharging the articles from those weighing machines corresponding to the particular combination.

6. The method as defined in claim 5, wherein the articles are discharged provided the sum of weight of articles in that combination falls between upper and lower limits.

7. The method of obtaining a combination of articles of desired number comprising the steps of:
   weighing groups of articles with a plurality of weighing machines;
   converting analog output signals from the weighing machines into digital signals in succession for storage in a microcomputer;
   dividing the weight of articles in each group to find the number of articles therein;
   computing the sum of number and the sum of weight of articles for every combination of said groups of articles;
   storing all or part of the combinations;

selecting a particular combination from among the stored combinations in which one of the sum of number and the sum of weight is equal to or nearest a preset value with the other within a preset range of allowance, or both of them fall within a preset range of allowance; and discharging the articles from those weighing machines corresponding to the particular combination.

8. In a method for combinational weighing, the steps of:

weighing batches of articles in a plurality of weighing units to produce a plurality of analog batch weight signals;

converting said analog batch weight signals into digital batch weight signals;

storing each of said digital batch weight signals;

summing said stored digital batch weight signals in a plurality of different combinations to produce a plurality of associated digital combination weight signals;

storing each of said different combinations and said digital combination weight signals associated therewith;

selecting one of said stored combinations based on analyzing said stored digital combination weight signals in accordance with prearranged combination weight selection criteria; and discharging article batches associated with said selected combination.

9. The method of claim 8, wherein each of said article batches comprises a plurality of individual articles having a predetermined average weight, and said step of selecting includes the steps of:

converting each said stored digital batch weight signal into a digital batch number signal by dividing each by a digital signal corresponding to said predetermined average weight;

storing each of said digital batch number signals;

summing said digital batch number signals in a plurality of different combinations to produce a plurality of digital combination number signals; and analyzing said plurality of digital combination number signals in accordance with prearranged combination number selection criteria to produce said selected combination of article batches.

10. The method of claim 8, wherein each of said article batches comprises a plurality of individual articles having a predetermined average weight; and wherein said step of selecting includes the steps of:

converting each said stored digital batch weight signal into a digital batch number signal by dividing each by a digital signal corresponding to said predetermined average weight;

storing each of said digital batch number signals;

summing said digital batch number signals in a plurality of different combinations to produce a plurality of digital combination number signals; and summing said digital batch weight signals in a corresponding plurality of different combinations to produce a plurality of digital combination weight signals; and analyzing said plurality of digital combination number signals and said corresponding plurality of digital combination weight signals in accordance with prearranged combination number and weight selection criteria to produce said selected combination of article batches.

11. The method of claim 8, wherein said step of summing comprises summing all possible combinations of said stored digital batch weight signals to produce digital combination weight signals corresponding to all possible combinations of said article batches.

12. The method of claim 11, wherein said step of analyzing includes the steps of:

analyzing each of said stored digital combination weight signals to select one equal to or nearest said preset total batch weight; and analyzing said selected one of said stored digital combination weight signals to determine whether its value is between said upper and lower limits; and wherein said step of discharging is inhibited if said selected one of said stored digital combination weight signals has a value outside said upper and lower limits.

13. The method of claim 11, wherein said step of analyzing includes the steps of:

(a) analyzing each of said stored digital combination weight signals to select one having values between said preselected upper and lower limits;

(b) storing combination signals and associated digital combination weight signals selected in step (a); and analyzing said stored digital combination weight signals to select one equal to or nearest said preset total batch weight; and wherein said step of discharging is inhibited if step (a) results in no selected combinations.

14. The method of claim 11, wherein said step of summing comprises summing all possible combinations of said stored digital batch weight signals to produce digital combination weight signals corresponding to all possible combinations of said article batches; and said step of analyzing comprises the steps of:

(a) analyzing said digital combination weight signals to select ones having values between preset upper and lower limits;

(b) storing combinations and associated digital combination weight signals selected in step (a); and (c) analyzing said digital combination weight signals stored in step (b) to select one having a value equal to nearest said preset weight.

* * * * *